Patented Apr. 22, 1952

2,593,827

UNITED STATES PATENT OFFICE 2,593,827

METHOD OF CASTING SHEETS OF POLYMERIZED α-CHLOROACRYLIC ACID ESTERS

Harry D. Anspon, Easton, and Frank E. Pschorr, Bethlehem, Pa., assignors to General Aniline & Film Corporation, New York, N. Y., a corporation of Delaware No Drawing. Application November 7, 1950, Serial No. 194,576

3 Claims. (Cl. 18—58)

This invention relates to an improvement in casting sheets of polymerized α-chloroacrylic acid and polymerized nitrile, amide and esters thereof, especially of polymerized methyl α-chloroacrylate, by mass polymerization of the corresponding monomers in glass molds.

Methyl α-chloroacrylate can be polymerized by mass polymerization to a thermoplastic resin of exceptional hardness and transparency, having an initial heat distortion temperature of about 135° C. The resulting polymers are especially useful in the production of transparent sheets having unusual durability and resistance to abrasion, rendering them highly desirable as window material for airplanes and other high-speed vehicles.

Such sheets can be conveniently made by mass polymerization of the monomers in molds constructed of a pair of glass plates, disposed in face-to-face spaced parallel relation, and interconnected by a flexible edge closure. The monomeric ester, containing a polymerization catalyst (e. g. an organic peroxide such as benzoyl peroxide or ditertiary butyl peroxide) is introduced in liquid form into the mold, and polymerization is effected by gradually heating to elevated temperatures generally attaining 120 to 130° C.

Contraction occurring during polymerization while the polymer mass is more or less plastic, causes no difficulty. The flexible edge seal permits the mold plates to move together without causing undue strain. However, upon cooling the mold and its contents after polymerization is complete and the resin is fully hardened, the contraction of the resin, which exceeds that of the glass, tends to cause breakage of the mold plates and the polymer sheet. One cause of such breakage is the tendency of the resin to adhere to the glass, such adhesion, if not counteracted, being so strong that fragments of glass are often torn from the surface of the mold plates by the resin when failure occurs. This can be overcome, however, by inclusion of appropriate adhesion-reducing agents in the monomer before introducing it into the mold.

However, another cause of breakage lies in the formation of a lip at the edge of the polymer sheet, overlapping the edge of the mold plates, and causing excessive stress in the mold plate and polymer sheet on contraction of the latter during cooling. While lip formation can be reduced by more thoroughly securing the flexible edge seal to the mold plates, and indenting the seal before introducing the monomer, this is not universally effective in practice, especially in casting relatively thin polymer sheets (e. g. sheets having a thickness of the order of one-eighth inch) and breakage still constitutes a serious loss in the manufacture of such sheets.

It is an object of this invention to provide a technique whereby breakage of the glass molds and/or polymer sheets in the mass polymerization of methyl α-chloroacrylate and other esters of α-chloroacrylic acid, and also of α-chloroacrylic acid, its nitrile and amide, is avoided despite the formation of a polymer lip at the edge of the mold.

This object is accomplished in accordance with our invention by removing the mold plates from the completed polymer sheet when the latter has cooled from the final polymerization temperature to 30 to 40° C. below the initial heat distortion temperature, of the polymer. Thus, in the case of polymerized methyl α-chloroacrylate, the mold plates are removed when the polymer has cooled to a temperature of 95 to 105° C. We have found that the plates can be removed from the mold at this temperature without warping, while at the same time, no breakage occurs due to lip formation. Removal of the mold plates at higher temperatures results in warping of the polymer sheet, while cooling to substantially lower temperatures in the mold almost invariably results in breakage if a polymer lip has formed.

In addition to its application for the preparation of sheets of polymerized methyl α-chloroacrylate, the technique of this invention is also effective in the production of sheets from monomers yielding hard mass polymers whose coefficient of expansion is greater than that of glass, e. g. from other esters of α-chloroacrylic acid as well as α-chloroacrylic acid, its nitrile and amide. The other esters include lower alkyl esters such as the ethyl and propyl esters, alkylene diesters such as the di-α-chloroacrylic ester of ethylene glycol, and alkenyl esters such as the vinyl, allyl or methallyl ester of a chloroacrylic acid.

In general, removal of the mold plates during cooling of the polymer at a temperature of 95 to 105° C. is similarly effective in the case of the aforesaid α-chloroacrylic esters to prevent breakage of the mold or sheet from lip formation while at the same time avoiding warping of the polymer sheet. When polymers of substantially higher or lower initial heat distortion temperature than polymethyl α-chloroacrylate are cast in sheets, the temperature for removing the plates can be correspondingly raised or lowered so that it will be 30 to 40° C. below the initial heat distortion temperature of the polymer.

In order to avoid breakage from adhesion of the polymer to the glass mold plates, agents can be added to the monomer before introduction into the mold. Suitable agents for this purpose are, for example, dioctyl sodium sulfosuccinate and dialkyl siloxane-diaryl siloxane polymers of oily consistency (e. g. Dow-Corning 550 Silicone Oil). Such agents are advantageously added to the monomeric α-chloroacrylic acid, ester or amide in amounts corresponding to 0.01 to 0.1% of the weight of the monomer. Other adjuvants such as discoloration inhibitors can be added, if desired.

Suitable molds can be made by placing two similar plate glass sheets in spaced parallel face-to-face relation, e. g. by inserting spacers between the plates, of a thickness corresponding to that of a monomer layer yielding a polymer sheet of the desired thickness. For example, to obtain one-eighth inch sheets of polymerized methyl ι-chloroacrylate from the corresponding monomer, the mold plates are spaced initially 0.162 inch apart. The edges of the plates are then joined by a flexible sealing strip, impervious toward the monomer, and fastened to the edge of the mold plates with an adhesive which is inert toward the monomer and polymer during polymerization.

Heavy paper impregnated with protein glue can be used for this purpose, attached to the glass plates by a proteinaceous adhesive. The sealing strip is advantageously arranged to enclose the space between the plates except for a filler opening, which can be sealed after filling the mold with the monomer. After filling the mold with the monomer, polymerization can be effected by heating at polymerization temperatures.

The technique of our invention is illustrated in the following example. Percentages are by weight.

Example

Monomeric methyl α-chloroacrylate containing 0.04% of a dialkyl siloxane polymer oil (Dow-Corning Type 550 Silicone Oil) as an adhesion-reducing agent, and 0.05% of ditertiary butyl peroxide as a polymerization catalyst was poured into a plate glass mold of the type hereinbefore described, one to two feet square, the inner surfaces of the mold plates being spaced 0.162 inch apart so as to produce a one-eighth inch polymer sheet. Polymerization was partially effected by heating at 60° C. for 72 hours and then completed by heating at 120° C. for 24 hours. The mold and the polymer sheet contained therein were allowed to cool, and when the temperature attained the range of 95 to 105° C., the glass plates were removed. A smooth, transparent, colorless sheet of polymerized methyl α-chloroacrylate was obtained in one piece without blemish and without warping, and the glass plates were recovered intact, despite the fact that a lip had formed at the edge of the polymer sheet. Numerous repetitions of this procedure yielded similar results without breakage or damage to the polymer sheets or glass plates.

When a similar monomer composition was polymerized in like manner, however, and the mold and sheet assembly allowed to cool to room temperature before removing the glass plates, breakage of the mold plates and/or polymer sheet almost invariably occurred during cooling.

Instead of ditertiary butyl peroxide, employed as a polymerization catalyst in the example, other catalysts which are similarly effective at elevated temperatures can be employed, e. g. benzoyl peroxide and other organic peroxides. Similarly, other adhesion-reducing agents such as dioctyl sodium sulfosuccinate can be substituted for the silicone oil of the example. Color-inhibitors such as dibutyl tin diacetate can also be added, if desired.

Other esters of α-chloroacrylic acid of the class hereinbefore described which yield polymers of similar initial heat distortion temperature can be polymerized in the same manner, and breakage avoided by removing the mold plates at a temperature of 95 to 105° C. When α-chloroacrylic acid, its amide, nitrile or esters are employed yielding polymers of substantially higher or lower initial heat distortion temperature, similar results can be obtained by removing the mold plates when the polymer has cooled to a temperature 30 to 40° C. below the initial heat distortion temperature of the polymer.

The "initial heat distortion temperature" of the polymers, to which the foregoing specification and the following claims refer, signifies the heat distortion temperature of the polymer after polymerization is complete, i. e., when no further increase in heat distortion temperature occurs upon subjecting the polymer to further polymerization treatment, such as heating at the curing temperature employed for polymerization. The heat distortion temperature of the polymer is determined for the purposes of this invention by procedure D–648–45T of the Standards of the American Society for Testing Materials, which involves heating a bar of the polymer of standard dimensions (e. g. ½" x ½" x 5") immersed in a liquid (e. g. oil) heating bath, while supporting the bar horizontally at points adjacent its ends (e. g. 4" apart) and loading it at its mid-point with a standard weight, raising the temperature at a standard rate (2° C. per minute), and determining the temperature at which the loaded mid-portion of the bar is displaced to a standard extent (0.01 inch).

Variations and modifications which will be obvious to those skilled in the art can be made in the foregoing procedure without departing from the scope or spirit of the invention.

We claim:

1. In the production of polymer sheets by thermal polymerization of a member of the group consisting of monomeric α-chloroacrylic acid, α-chloroacrylonitrile, α-chloroacrylamide and esters of α-chloroacrylic acid, between glass mold plates interconnected by a flexible edge closure and subject to formation of a polymer lip at the edge of the mold plates, said monomer containing an agent which reduces the adhesion of the resulting polymer toward glass, the improvement which comprises removing said mold plates from the polymer sheet when the latter has cooled to a temperature 30 to 40° C. below its initial heat distortion temperature, after completing the polymerization at a higher temperature.

2. In the production of polymer sheets by thermal polymerization of a monomeric ester of α-chloroacrylic acid between glass mold plates interconnected by a flexible edge closure and subject to formation of a polymer lip at the edge of the mold plates, said monomer containing an agent which reduces the adhesion of the resulting polymer toward glass, the improvement which comprises removing said mold plates from the polymer sheet when the latter has cooled to a temperature of 95 to 105° C., after completing the polymerization at a higher temperature.

3. In the production of polymer sheets by thermal polymerization of monomeric methyl α-chloroacrylate between glass mold plates interconnected by a flexible edge closure and subject to formation of a polymer lip at the edge of the mold plates, said monomer containing an agent which reduces the adhesion of the resulting polymer toward glass, the improvement which comprises removing said mold plates from the polymer sheet when the latter has cooled to a temperature of 95 to 105° C. after completing the polymerization at a temperature of 120 to 130° C.

HARRY D. ANSPON.
FRANK E. PSCHORR.

REFERENCES CITED

The following references are of record in the file of this patent:

UNITED STATES PATENTS

| Number | Name | Date |
| --- | --- | --- |
| 2,457,114 | Amenta | Dec. 28, 1948 |
| 2,480,751 | Marks | Aug. 30, 1949 |